(12) United States Patent
Kono

(10) Patent No.: US 6,655,445 B2
(45) Date of Patent: *Dec. 2, 2003

(54) INJECTION MOLDING METHOD AND APPARATUS WITH REDUCED PISTON LEAKAGE

(75) Inventor: Kaname Kono, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/286,866

(22) Filed: Nov. 4, 2002

(65) Prior Publication Data

US 2003/0056932 A1 Mar. 27, 2003

Related U.S. Application Data

(62) Division of application No. 09/949,952, filed on Sep. 12, 2001, now Pat. No. 6,474,399, which is a continuation-in-part of application No. 09/842,092, filed on Apr. 26, 2001, now Pat. No. 6,540,006, which is a division of application No. 09/330,147, filed on Jun. 11, 1999, now Pat. No. 6,283,197, which is a division of application No. 09/160,792, filed on Sep. 25, 1998, now Pat. No. 5,983,976.

(60) Provisional application No. 60/080,078, filed on Mar. 31, 1998.

(51) Int. Cl.$^7$ ............................. B22D 17/00; B22D 17/10
(52) U.S. Cl. ..................... 164/113; 164/312; 164/900
(58) Field of Search .................. 164/113, 312, 164/900

(56) References Cited

U.S. PATENT DOCUMENTS 2,386,966 A   10/1945 MacMillin
2,505,540 A   4/1950 Goldhard
2,529,146 A   11/1950 Feitl
2,785,448 A   3/1957 Hodler
3,048,892 A   8/1962 Davis, Jr. et al.
3,106,002 A   10/1963 Bauer
3,189,945 A   6/1965 Strauss (List continued on next page.)

FOREIGN PATENT DOCUMENTS

DE   196 11 419   9/1996
EP   0 476 843   3/1992
EP   0 761 344   3/1997

(List continued on next page.)

OTHER PUBLICATIONS

Kalpakjian, Serope, *Manufacturing Processes for Engineering Materials*, 3rd edition, Addison Wesley Longman, Inc., Menlo Park, CA, 1997, pp. 261–263, 265–266.

(List continued on next page.)

Primary Examiner—Kuang Y. Lin
(74) Attorney, Agent, or Firm—Foley & Lardner (57) ABSTRACT

A metal injection molding apparatus is provided with features which reduce the amount of metal which enters the drive mechanism of the apparatus. The apparatus contains a piston having the head and the shaft, the shaft having a diameter smaller than the diameter of the head. At least one piston ring circumscribes the piston shaft. The apparatus contains an injection chamber having an accumulation portion and a shaft housing portion. The shaft housing portion has openings in the sidewalls and a polygonal internal cross section. The accumulation portion of the injection chamber is maintained at a higher temperature than the shaft housing portion.

10 Claims, 3 Drawing Sheets

U.S. PATENT DOCUMENTS

| | | |
|---|---|---|
| 3,201,836 A | 8/1965 | Nyselius |
| 3,254,377 A | 6/1966 | Morton |
| 3,268,960 A | 8/1966 | Morton |
| 3,270,383 A | 9/1966 | Hall et al. |
| 3,286,960 A | 11/1966 | Hall et al. |
| 3,319,702 A | 5/1967 | Hartwig et al. |
| 3,344,848 A | 10/1967 | Hall et al. |
| 3,447,593 A | 6/1969 | Nyselius et al. |
| 3,529,814 A | 9/1970 | Werner |
| 3,550,207 A | 12/1970 | Strauss |
| 3,693,702 A | 9/1972 | Piekenbrink et al. |
| 3,773,873 A | 11/1973 | Spaak et al. |
| 3,810,505 A | 5/1974 | Cross |
| 3,814,170 A | 6/1974 | Kahn |
| 3,874,207 A | 4/1975 | Lemelson |
| 3,893,792 A | 7/1975 | Laczko |
| 3,902,544 A | 9/1975 | Flemings et al. |
| 3,936,298 A | 2/1976 | Mehrabian et al. |
| 3,976,118 A | 8/1976 | Kahn |
| 4,049,040 A | 9/1977 | Lynch |
| 4,088,178 A | 5/1978 | Ueno et al. |
| 4,168,789 A | 9/1979 | Deshais et al. |
| 4,212,625 A | 7/1980 | Shutt |
| 4,287,935 A | 9/1981 | Ueno et al. |
| 4,330,026 A | 5/1982 | Fink |
| 4,347,889 A | 9/1982 | Komatsu et al. |
| 4,434,839 A | 3/1984 | Vogel |
| 4,436,140 A | 3/1984 | Ebisawa et al. |
| 4,473,103 A | 9/1984 | Kenney et al. |
| 4,476,912 A | 10/1984 | Harvill |
| 4,510,987 A | 4/1985 | Collot |
| 4,534,403 A | 8/1985 | Harvill |
| 4,537,242 A | 8/1985 | Pryor et al. |
| 4,559,991 A | 12/1985 | Motomura et al. |
| 4,586,560 A | 5/1986 | Ikeya et al. |
| 4,635,706 A | 1/1987 | Behrens |
| 4,687,042 A | 8/1987 | Young |
| 4,694,881 A | 9/1987 | Busk |
| 4,694,882 A | 9/1987 | Busk |
| 4,730,658 A | 3/1988 | Nakano |
| 4,771,818 A | 9/1988 | Kenney |
| 4,828,460 A | 5/1989 | Saito et al. |
| 4,834,166 A | 5/1989 | Nakano |
| 4,884,621 A | 12/1989 | Ban et al. |
| 4,898,714 A | 2/1990 | Urban et al. |
| 4,952,364 A | 8/1990 | Matsuda et al. |
| 4,997,027 A | 3/1991 | Akimoto |
| 5,040,589 A | 8/1991 | Bradley et al. |
| 5,109,914 A | 5/1992 | Kidd et al. |
| 5,143,141 A | 9/1992 | Frulla |
| 5,144,998 A | 9/1992 | Hirai et al. |
| 5,161,598 A | 11/1992 | Iwamoto et al. |
| 5,181,551 A | 1/1993 | Kidd et al. |
| 5,186,236 A | 2/1993 | Gabathuler et al. |
| 5,191,929 A | 3/1993 | Kubota et al. |
| 5,205,338 A | 4/1993 | Shimmell |
| 5,244,033 A | 9/1993 | Ueno |
| 5,375,645 A | 12/1994 | Brueker et al. |
| 5,380,187 A | 1/1995 | Fujikawa |
| 5,388,633 A | 2/1995 | Mercer, II et al. |
| 5,394,931 A | 3/1995 | Shiina et al. |
| 5,413,644 A | 5/1995 | Marder et al. |
| 5,501,266 A | 3/1996 | Wang et al. |
| 5,531,261 A | 7/1996 | Yoshida et al. |
| 5,533,562 A | 7/1996 | Moschini et al. |
| 5,571,346 A | 11/1996 | Bergsma |
| 5,575,325 A | 11/1996 | Sugiura et al. |
| 5,577,546 A | 11/1996 | Kjar et al. |
| 5,601,136 A | 2/1997 | Shimmell |
| 5,622,216 A | 4/1997 | Brown |
| 5,623,984 A | 4/1997 | Nozaki et al. |
| 5,630,463 A | 5/1997 | Shimmell |
| 5,630,466 A | 5/1997 | Garat et al. |
| 5,638,889 A | 6/1997 | Sugiura et al. |
| 5,657,812 A | 8/1997 | Walter et al. |
| 5,662,159 A | 9/1997 | Iwamoto et al. |
| 5,664,618 A | 9/1997 | Kai et al. |
| 5,665,302 A | 9/1997 | Benni et al. |
| 5,680,894 A | 10/1997 | Kilbert |
| 5,685,357 A | 11/1997 | Kato et al. |
| 5,697,422 A | 12/1997 | Righi et al. |
| 5,697,425 A | 12/1997 | Nanba et al. |
| 5,701,942 A | 12/1997 | Adachi et al. |
| 5,704,411 A | 1/1998 | Suzuki et al. |
| 5,716,467 A | 2/1998 | Marder et al. |
| 5,730,198 A | 3/1998 | Sircar |
| 5,730,202 A | 3/1998 | Shimmell |
| 5,735,333 A | 4/1998 | Nagawa |
| 5,770,245 A | 6/1998 | Takizawa et al. |
| 5,836,372 A | 11/1998 | Kono |
| 5,839,497 A | 11/1998 | Fujino et al. |
| 5,861,182 A | 1/1999 | Takizawa et al. |
| 5,913,353 A | 6/1999 | Riley et al. |
| 5,983,976 A | 11/1999 | Kono |
| 6,059,012 A | 5/2000 | Vining et al. |
| 6,065,526 A | 5/2000 | Kono |
| 6,135,196 A | 10/2000 | Kono |
| 6,241,001 B1 | 6/2001 | Kono |
| 6,276,434 B1 | 8/2001 | Kono |
| 6,283,197 B1 | 9/2001 | Kono |
| 6,284,167 B1 | 9/2001 | Fujikawa |
| 6,306,231 B1 | 10/2001 | Sakamoto et al. |

FOREIGN PATENT DOCUMENTS

| | | |
|---|---|---|
| FR | 1.447.606 | 6/1966 |
| JP | 1166874 | 6/1989 |
| JP | 1-178345 | 7/1989 |
| JP | 2-274360 | 11/1990 |
| JP | 5-8016 A | 1/1993 |
| JP | 05 008017 | 1/1993 |
| JP | 5-285626 | 11/1993 |
| JP | 5-285627 | 11/1993 |
| JP | 6-306501 | 11/1994 |
| JP | 7-51827 | 2/1995 |
| JP | 8-72110 | 3/1996 |
| JP | 8-174172 | 7/1996 |
| JP | 8-252661 | 10/1996 |
| JP | 9-103859 | 4/1997 |
| JP | 9-155524 | 6/1997 |
| JP | 9-155526 | 6/1997 |
| JP | 9-155527 | 6/1997 |
| JP | 9-295122 | 11/1997 |
| TW | 153528 | 3/1991 |
| WO | 97/21509 | 6/1997 |
| WO | 99/28065 | 6/1999 |
| WO | 99-28065 | 6/1999 |
| WO | 99/50007 | 10/1999 |

OTHER PUBLICATIONS

Material Science & Technology Textbook, Fig. 1–67(b), p 52.

Flemings et al., "Rheocasting", *Materials Science And Engineering*, vol. 25: 103–117, (1976).

Worthy, "Injection Molding Of Magnessium Alloys", *Chemical & Engineering News*, pp. 29–30, (1988).

Tissier et al., "Magnesium Rheocasting: A Study Of processing—Microstructure Interactions", *Journal of Materials Science*, vol. 25:1184–1196, (1990).

Carnahan et al., "New Manufacturing Process For Metal Matrix Composite Synthesis", *Fabrication Of Particulates Reinforced Metal Composites, Proceedings Of An International Conferences*, pp. 101–105, (1990).

Pasternak et al., "Semi–Solid Production processing Of Magnesium Alloys By thixomolding", *Proceedings Of The Second International Conference On The Semi–Solid Processing Of Alloys And Composites*, pp. 159–169, (1992).

Staff Report, "Semi–Solid Metalcasting Gains Acceptance, Applications", *Foundry Management & Technology*, pp. 23–26, (1995).

R.D. Carnalman et al., "Advances In Thisomolding", 52$^{nd}$ Annual World Magnesium Conference, May 17–19, (1994.

R.D. Carnahan et al., "New Manufacturing Process For Metal Matrix Composite Synthesis".

"Plastic processing Technology Book", Published in Japan.

"Advertisement Foro Sodick Tupal Injection Machine", May 1997, and "Sodick Advertising Material" (no date) and English Translations.

Sodick, Seminar Material, Japan, Jul. 1995, by M. Fujikawa and English Translation.

R. Mehrabian et al., "Castng in the Liquid–Solid Region," New Trend In Materials Processing, Papers presented at a seminar of AST, Oct. 19 and 20, 1974, ASM, 98–127 (1974).

M. Suery et al., "Effect of Strain Rate On Deformation Behavior Of Semi–Solid Dendritic Alloys", *Metal. Trans. A.*, vol. 13A, No. 10: 1809–1819, (1982).

M.C. Flemings et al., "Rheocasting", *McGraw–Hill Yearbook of Science and Technology*, pp. 49–59, (1978).

V. Laxmanan et al., "Deformation of Semi–Solid Sn–15 Pct. Pb Alloy", *Metall. Trans. A.*, vol. 11A: 1927–1937, (1980).

T. Matsumiya et al., "Modeling of Continuous Strip Production By Rheocasting", *Metall. Trans. B.*, vol. 12B: 17–31, (1981).

S.B. Brown et al., "New Shape Forming via Semi–Solid Processing", *Advanced Materials & Processes*, vol. 143(1):36–40, (1993).

Takao: "Pressure Measuring Device of Plasticizing Material in Injection Molding and Injection Molding Machine"; Patent Abstracts of Japan vol. 014, No. 495; Oct. 29, 1990; Publication No. 02 202420; Publication Date: Aug. 10, 1990; Abstract.

Keizo; "Method and Apparatus for Continuously Forming Metallic Slurry for Continuous Casting"; Patent Abstracts of Japan; vol. 013, No. 484; Nov. 2, 1989; Publication No. 01 192447; Publication Date: Aug. 2, 1989; Abstract.

Kenjiro; "Method for Injection Molding Foamed and Molded Item"; Patent Abstract of Japan; vol. 008, No. 284; Dec. 26, 1984; Publication No. 59 152826; Publication Date: Aug. 31, 1984; Abstract.

"Semi–Solid Metalcasting", Foundry Management and Technology, Japan, Nov. 1995.

"Injection Molding of Magnesium Alloys", Chemcial Engineering News, Jun. 6, 1988.

Flemings, M.C., "Behavior of Metal Alloys in the Semisolid State," *Metallurgical Transactions B*, vol. 22B, No. 3, 269–293 (1991).

INJECTION MOLDING METHOD AND APPARATUS WITH REDUCED PISTON LEAKAGE

This application is a divisional of application Ser. No. 09/949,952, filed on Sep. 12, 2001 now U.S. Pat. No. 6,474,399, which is a continuation-in-part of application Ser. No. 09/842,092, filed Apr. 26, 2001, which is a divisional of application Ser. No. 09/330,147, filed Jun. 11, 1999, which is a divisional application Ser. No. 09/160,792, filed Sep. 25, 1998, now U.S. Pat. No. 5,983,976, which claims the benefit of U.S. Provisional Application No. 60/080,078, filed Mar. 31, 1998, which are hereby incorporated by reference in their entirety.

FIELD OF THE INVENTION

The present invention is directed generally to injection molding methods and machines and more particularly to a device and method for reducing the leakage of liquid past the piston in an injection molding machine.

BACKGROUND OF THE INVENTION

One conventional method used to produce molded metal alloys is the die cast method. In this method, the metal to be injected is heated above its liquidus temperature and then forced into the mold by the extension of a piston in the injection chamber. Another conventional method is the thixotropic injection molding method. In this method, the metal is first heated to a thixotropic state rather than to a completely liquid state, and then injected into a mold from an injection chamber. In this method, a screw rather than a piston is often used to inject the metal into the mold. The piston and the screw contain a shaft portion, which is attached to a drive mechanism. The drive mechanism is typically a motor, however, hydraulic mechanisms have also been used.

Although conventional liquid metal injection molding and thixotropic metal injection molding have been used successfully in the past, conventional machines suffer from metal leaking backwards past the piston or screw into the drive mechanism, rather than being injected forward into the mold. This occurs because high pressure is required to force the metal completely into the mold and it impossible to manufacture an apparatus without some clearance between the piston or screw and the inner wall of the injection chamber. Thus, the metal is forced past the piston or screw into the shaft housing. Some of this metal may reach the driving mechanism of the piston or screw and damage it. Thus, a device reducing the leakage of metal to the rear of the shaft housing in the injection molding of liquid and thixotropic metals is desired.

SUMMARY OF THE INVENTION

A preferred embodiment present invention provides an injection molding apparatus, comprising an injection chamber, an injection member comprising a head and a shaft located in the injection chamber, and at least one protrusion adjacent to the shaft.

Another preferred embodiment of the present invention provides an injection molding apparatus, comprising an injection chamber comprising a shaft housing portion having a polygonal internal cross section, and an injection member comprising a head and a shaft located in the injection chamber.

Another preferred embodiment of the present invention provides an injection molding apparatus, comprising an injection chamber comprising an accumulation portion and a shaft housing portion, at least one opening in a side wall of the shaft housing portion of the injection chamber, and an injection member comprising a head and a shaft located in the injection chamber.

Another preferred embodiment of the present invention provides an injection molding apparatus, comprising an injection chamber comprising an accumulation portion and a shaft housing portion, an injection member comprising a head and a shaft located in the injection chamber, a first means for heating the accumulation portion of the injection chamber to a first temperature above a liquidus temperature of a metal injected by the injection member, and a second means for heating the shaft housing portion of the injection chamber to a second temperature below a liquidus temperature of the metal injected by the injection member.

Another preferred embodiment of the present invention provides an injection molding apparatus, comprising a piston comprising a head and a shaft, the shaft having a diameter smaller than a diameter of the head, a first injection chamber portion having a front end, a back end and a cavity having a circular internal cross section and containing the piston head. The apparatus further comprises a second injection chamber portion joined to the back end of the first chamber portion, the second chamber portion having a front end, a back end and a cavity having a polygonal internal cross section and containing the piston shaft, at least one opening in at least one side wall of the second injection chamber portion, and at least one piston ring circumscribing the piston shaft.

Another preferred embodiment of the present invention provides a method of making an injection molded metal part, comprising providing a metal into an accumulation portion of an injection chamber, maintaining the accumulation portion of the injection chamber at a first temperature above the liquidus temperature of the metal, maintaining a shaft portion of the injection chamber at a second temperature below the liquidus temperature of the metal, and advancing an injection member having a head and a shaft in the injection chamber to inject the metal from the accumulation portion into a mold cavity.

BRIEF DESCRIPTION OF THE DRAWINGS

The foregoing and other features, aspects and advantages of the present invention will become apparent from the following description, appended claims and the exemplary embodiments shown in the drawings, which are briefly described below. It should be noted that unless otherwise specified like elements have the same reference numbers.

FIG. 2b is a perspective view of an alternative aspect of a portion of the apparatus illustrated in FIG. 2a.

FIG. 2c is a side cross sectional view of an alternative aspect of the apparatus illustrated in FIG. 2a.

FIG. 3 is a perspective view of an alternative aspect of the apparatus illustrated in FIG. 2a.

DETAILED DESCRIPTION OF THE PREFERRED EMBODIMENTS

The present inventor has discovered several features which either singly or in combination reduce the amount of metal flowing through the shaft housing into the drive mechanism. These features provide significant protection for the drive mechanism and extend the life of the injection molding apparatus. These features include shaft rings, openings in the shaft housing, a shaft housing having a polygonal cross section, and maintaining the shaft housing at a lower temperature than the metal accumulation portion of the injection chamber.

Figure 1A:
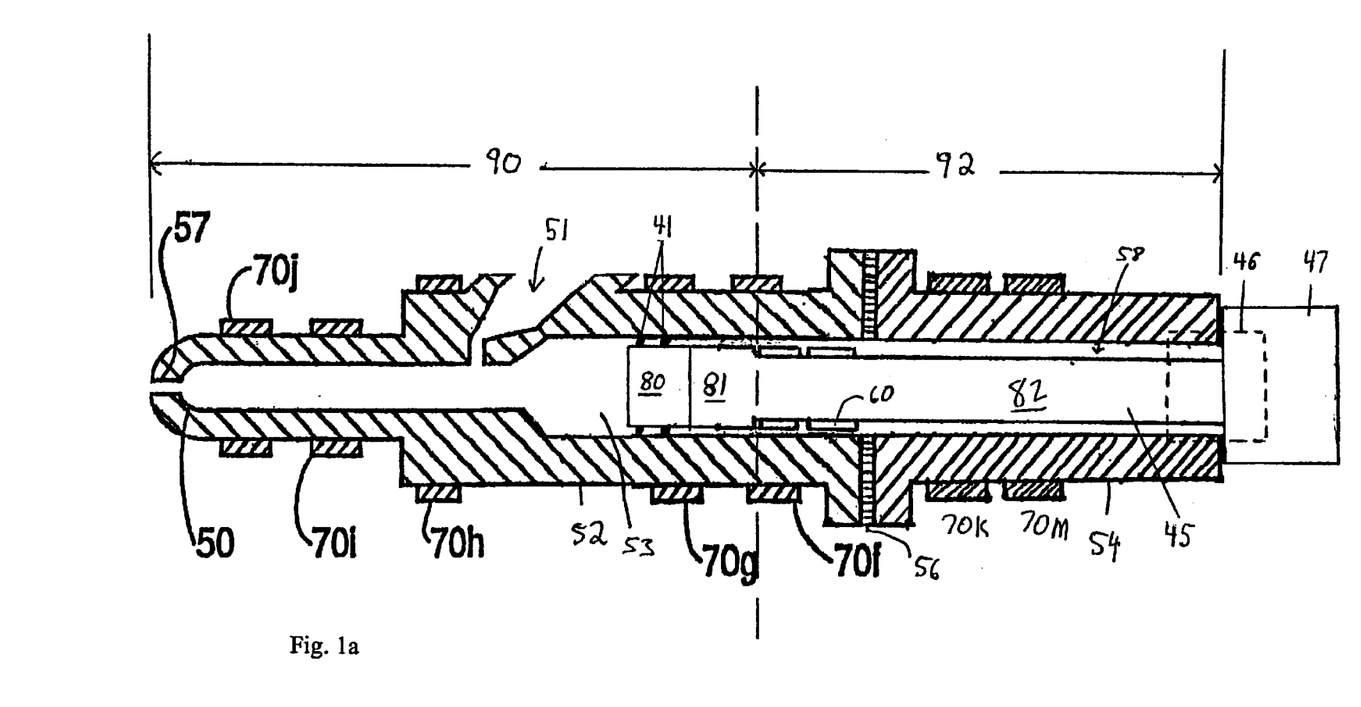
FIG. 1a is a schematic side cross sectional view of an apparatus according to a first preferred embodiment of the invention.

FIG. 1a illustrates an injection chamber 50 of an injection molding apparatus. Preferably, the apparatus is used to inject a metal into a mold. Preferably the metal is injected in the liquid state. However, if desired, the apparatus may also be adapted to inject metal in the thixotropic state or even plastic into a mold cavity. The material to be injected, such as a liquid or thixotropic metal, enters the injection chamber through an entry opening 51. The opening 51 may be a passageway connected to another chamber of the injection molding apparatus which provides liquid or thixotropic metal. The opening 51 may also be a direct passageway to a hopper which provides solid metal particles into the injection chamber. Alternatively, the opening 51 may be an opening in the top of the injection molding apparatus through which the metal in the liquid, thixotropic or solid state is provided.

The injection chamber contains an injection member, which injects the metal present in the injection chamber 50 into a mold cavity through a nozzle aperture 57. Preferably, the injection member comprises a piston or plunger 45. The piston 45 has a head 80, a spacer 81, and a shaft 82. Preferably, the head 80 and the spacer 81 have the same diameter, while the shaft 82 has a smaller diameter. In the most preferred embodiment of the invention, the head 80 is removable from the spacer 81 and can be easily replaced when worn. However, the head 80 and the spacer 81 may be formed integrally.

Typically, the head 80 has a diameter slightly smaller than the inner diameter of the injection chamber 50. The head 80 is used to push the metal from the injection chamber 50 out through the nozzle aperture 57. Circumscribing the head 80 are one or more seals 41. The piston head 80 is attached to a spacer 81 which has the same diameter as the piston head 80. A piston shaft is connected to the other side of the spacer 81. The piston shaft 82 has a diameter smaller than the spacer 81. The shaft 82 is connected to a drive mechanism 47 which is used to move the piston 45 back and forth in the injection chamber 50. The drive mechanism may be a motor or a hydraulic mechanism. The diameter of the piston shaft 82 may be selected to optimize leakage reduction. Factors which may effect the choice of diameter include, but are not limited to, the metal to be injected, the casting temperature, and the casting pressure.

In an alternative aspect of the present invention, the injection member comprises a 'screw. The screw contains a head portion which is the threaded portion which advances the metal in the injection chamber forward, and a shaft portion which is connected to the screw drive mechanism.

In a first preferred embodiment of the present invention, at least one protrusion or ridge is present on or adjacent to the shaft 82 to reduce the amount of metal flowing past the piston head 80 into the piston drive mechanism 47. Preferably, the protrusion or ridge is shaped as a ring 60, as shown in FIG. 1a. However, any other shaped protrusions or ridges may be used. FIG. 1a illustrates an embodiment with two rings 60. If desired, one or more than two rings may be used. The rings 60 may be separate, ring shaped parts which are attached around the shaft 82. Alternatively, the rings 60 may comprise integral sections of the shaft that have a larger diameter than the shaft 82 (i.e., ring shaped protrusions around the shaft 82). Thus, the rings move laterally in the injection chamber 50 with the shaft 82.

The diameter and width of each piston ring 60 is preferably similar to the diameter and width of the piston head 80. However the width of the rings 60 may be varied to be either greater or smaller than that of the piston head 80. The spacing between the piston head 80 and the first piston ring 60 is preferably about 0.5 to 2 mm, most preferably about 1 mm, but may be varied as necessary. If more than one piston ring is used, the spacing between successive piston rings is preferably about 0.5 to 2 mm, most preferably about 1 mm, but may be varied as necessary.

Figure 1B:
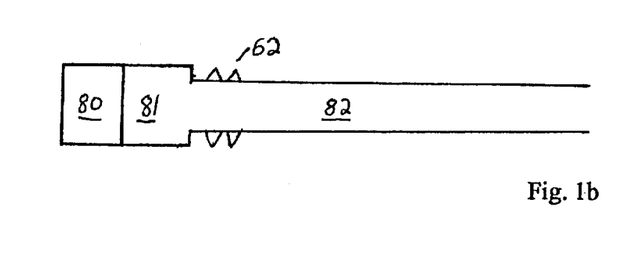
FIG. 1b is schematic cross sectional view according to another aspect of the first embodiment of the invention.

Another preferred aspect of the first embodiment of the invention is illustrated in FIG. 1b. In this embodiment, the rings 62 have a roughly triangular cross section. Thus, the portions of the rings 60 adjacent to the shaft 82 are wider than the portions distal from the shaft 82. Preferably, the rings have sharp or pointed tips (i.e. portions distal from the shaft 82). This cross section aids both in trapping metal flowing through the shaft housing toward the drive mechanism and in the removal of solidified metal adhered to the inner wall of the injection chamber.

In another alternative, and less preferred aspect of the first embodiment, the rings 60 are attached to or comprise portions of the injection chamber, (i.e., protrusions on the inner wall of the injection chamber). In this case, the rings 60 are positioned in the shaft housing portion of the injection chamber 50 and do not move with the shaft. In this aspect of the invention, the shaft 82 has a smaller outer diameter than the inner diameter of the rings 60. If desired, the rings 60 may be located both on the shaft and on the inner wall of the injection chamber. In this case, the outer diameter of the shaft rings should be smaller than the inner diameter of the chamber rings to allow the shaft rings to move with the shaft through the chamber rings.

The method by which the piston rings reduce the flow of metal to the rear of the injection chamber 50 is not known with certainty. While not wishing to be bound by any theory of operation, it is believed that some of the liquid or thixotropic metal gets temporarily trapped in the space between the spacer 81 and the first ring and in the space between the rings 60, where the metal viscosity increases. In some cases, solid metal then falls off the shaft 82 and is pulverized into harmless dust by the movement of the shaft 82. In other cases, rings 60 prevent high viscosity metal from leaking past the rings.

In a second preferred embodiment of the present invention, the injection chamber 50 has different portions having different cross sectional shapes. The first chamber portion 52, referred to as the accumulation portion, has an internal cavity 53 with a generally circular cross section. This portion 52 of the injection chamber 50 preferably extends from the injection nozzle 57 at least up to the position of the head 80 of the piston 45, when the piston is in the fully retracted position. The accumulation portion may extend beyond the position of the fully retracted head 80 of the piston, as shown in FIG. 1, if desired. The metal to be injected into the mold is present in this accumulation portion 52.

Adjacent to the rear of the accumulation portion 52 is a second chamber portion (shaft housing) 54 which has an internal cavity 58 with a generally polygonal cross section. The second portion 54, referred to as the shaft housing, preferably extends from the piston drive mechanism to at least a location behind the position of the head 80 of the piston 45, when the piston is in the fully retracted position, as shown in FIG. 1 (i.e., a portion of the shaft 82 is located in the accumulation portion 52). If desired, the shaft housing 54 may extend all the way to the position of the head 80 of the piston 45, when the piston is in the fully retracted position.

Spanning the rear portion of the shaft housing 54 and the housing of the drive mechanism 47 is a window 46. Through this window 47, technicians can monitor leakage of metal through the shaft housing 54 toward the drive mechanism 47. Additionally, the window allows access to the drive mechanism 47. Thus, adjustments and minor repairs can be made to the drive mechanism 47 without disassembling the drive mechanism 47.

The first 52 and second 54 injection chamber 50 portions may comprise different vessels attached to each other. Optionally, an insulating gasket 56 is provided in between the first chamber portion 52 and the second chamber portion 54. Alternatively, the first 52 and second 54 portions of the injection chamber 50 may comprise portions of the same vessel (i.e., having a continuous outer side wall between portions 52 and 54), but having different internal cross sections.

The injection chamber 50 is preferably made of steel. However, it may be made of any structural material suitable for the injection molding of metals. Other materials include, but are not limited to, superalloys, nickel alloys, cobalt alloys, and titanium alloys. The insulator material of the gasket 56 is preferably made of asbestos, a heat insulating ceramic or any other suitable heat resistant material.

Figure 2A:
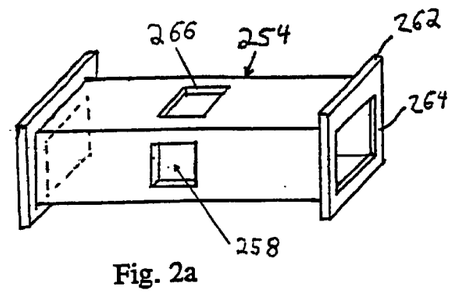
FIG. 2a is a perspective view of an apparatus according to another preferred embodiment of the invention.

FIG. 2a illustrates one preferred design of the shaft housing 254 of an injection chamber 250 according to the second preferred embodiment of the invention. In the preferred aspect shown in FIG. 2a, the shaft housing 254 has four walls and a cavity 258 with a square cross section. However, the shaft housing 254 may have any number of walls. The cross section of the cavity may be a variety of polygonal shapes including, for example, square, hexagonal and octagonal.

Figure 2B:
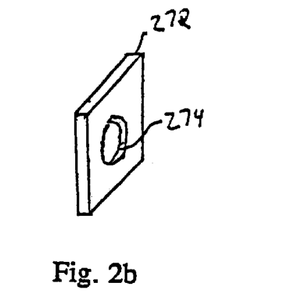

At either end of the shaft housing 254, there are flanges 262. One of the flanges can be attached to a corresponding flange on the end of the accumulation portion 52 of the injection chamber 50. The other flange may be attached to the drive mechanism 47. The flanges may be bolted, welded, clamped or affixed in any suitable manner. If an optional insulating gasket 56 is included, it is preferable to bolt the chambers together. A shaft hole 264 is included in the flanges 262. In this aspect of the invention, the shaft hole 264 is square. FIG. 2b illustrates a second aspect of the second embodiment of the invention. In this aspect, the shaft hole 274 is circular. In additional aspects of the invention, the shaft hole 274 may be of any shape including, for example, rectangular, hexagonal and octagonal.

Figures 2C, 3:
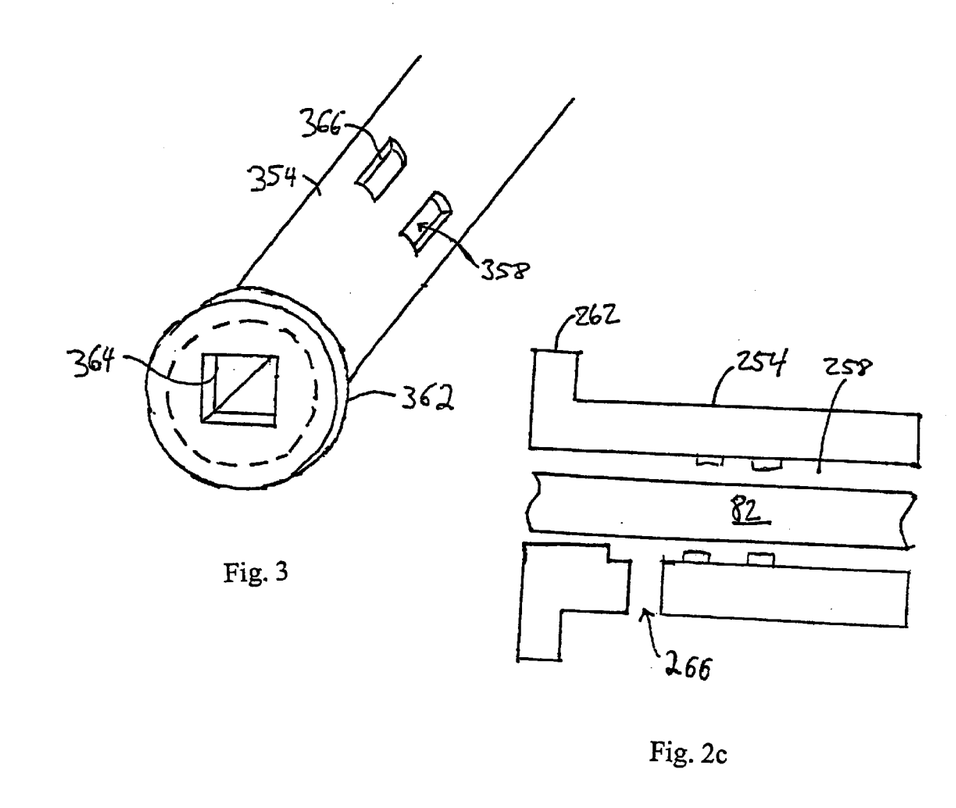

FIG. 3 illustrates another preferred design of a shaft housing 354. In this design, the shaft housing 354 has a cylindrical outside wall and a cavity 358 with a square or other polygonal cross section. The cross section of the cavity may be a variety of shapes including, for example, square, hexagonal and octagonal.

either end of the shaft housing 354 there are flanges 362. The flanges may be bolted, welded, clamped or affixed in any suitable manner. If an optional insulating gasket 56 is included, it is preferable to bolt the chamber portions together. The shaft holes 364 are included in the flanges 362. The shaft hole may be of any shape including, for example, circular rectangular, hexagonal and octagonal.

The shaft housing having a rectangular internal cross section contains the cylindrical shaft 82. Thus, empty space is provided at the corners of the polygonal shaft housing. Without wishing to be bound by specific theory of operation, it is believed that the liquid or thixotropic metal accumulates and solidifies in these empty space prior to entering the drive mechanism. Thus, the amount of metal entering the drive mechanism is reduced.

According to a third preferred embodiment of the present invention, the amount of metal leaking into the drive mechanism is reduced by providing at least one opening in the side walls of the shaft housing. The openings allow air to enter the shaft housing. As shown in FIGS. 2a and 3, the openings 266 and 366, respectively, may be located in one or more walls of the shaft housing. As illustrated in the Figures, the openings 266, 366 are square. However, the openings 266, 366 may be any of a variety of shapes, such as round, oval, rectangular, hexagonal, and octagonal.

The openings 266 provide at least two benefits. First, they allow cooling air to enter and solidify molten metal which managed to get past the piston head 80 and rings 60. Second, they are sufficiently unobstructed and have a sufficient size to allow the undesirable molten metal or solidified metal dust or particles (i.e., the metal that was supposed to be injected, but which entered the shaft housing instead) to exit out of the shaft housing 254, 354. Thus, the amount of molten metal which enters the drive mechanism 47 is reduced.

If desired, the openings 266 may be used in conjunction with the protrusions or rings 260 formed on the inner side wall of the shaft housing 254, as shown in FIG. 2c. It is believed that the protrusions or rings 260 temporarily trap the metal which enters the shaft housing. The metal then is able to exit the shaft housing through the openings 266. The protrusions 260 and openings 266 may be located on one or more side walls of the shaft housing.

According to a fourth embodiment of the present invention, the injection chamber 50 is divided into two temperature zones 90, 92. The first temperature zone extends approximately from the injection nozzle 57 of the injection chamber 50 to the back of the head 80 of the piston 45 when the piston is in a fully retracted state. The second temperature zone extends approximately from the back of the head of the piston when the piston is in a fully retracted state to the back end of the injection chamber 50. In a preferred aspect of the fourth embodiment, the first temperature zone corresponds to the accumulation portion 52 of the injection chamber, while the second temperature zone corresponds to the shaft housing 54. However, as illustrated in FIG. 1a, a part of the accumulation portion 52 may overlap the second temperature zone 92. Preferably, the first temperature zone 90 is maintained at a temperature 25–75° C. above the liquidus temperature of the metal to be injected. More preferably, the first temperature zone is maintained at a temperature 40–60° C. above the liquidus temperature of the metal to be injected. Preferably, the second temperature zone 92 is maintained at a temperature 10–50° C. below the liquidus temperature of the metal to be injected. More preferably, the second temperature zone is maintained at a temperature 20–40° C. below the liquidus temperature of the metal. Without wishing to be bound by any particular theory of operation, it is believed that by maintaining the second temperature zone 92 below the liquidus temperature of the metal to be injected, the viscosity of the metal which enters the second temperature zone 92 past the piston head 80 is increased. Thus, due to the increased viscosity of the metal located behind the piston head 80, the amount of metal which gets into the drive mechanism 47 is reduced.

As shown in FIG. 1a, the different temperature in zones 90 and 92 may be maintained by maintaining heating elements 70f–70m that are provided along the length of the injection chamber 50 at a different temperature. For example, the heating elements 70g, 70h, 70i and 70j are maintained above the liquidus temperature of the metal to be injected, while heating elements 70f, 70k and 70m may be maintained below the liquidus temperature of the metal to be injected. The heating elements may be inductive, resistance, convective, radiative or any other type of heating elements.

It should be noted that the features of the preferred embodiments of the present invention may be used alone or in any combination. Thus, all four features comprising piston rings, polygonal cross section in the shaft housing, openings in the shaft housing and below liquidus temperature in the second (i.e., rear) temperature zone may be used together, separately or in any combination of two or three features.

Figure 4:
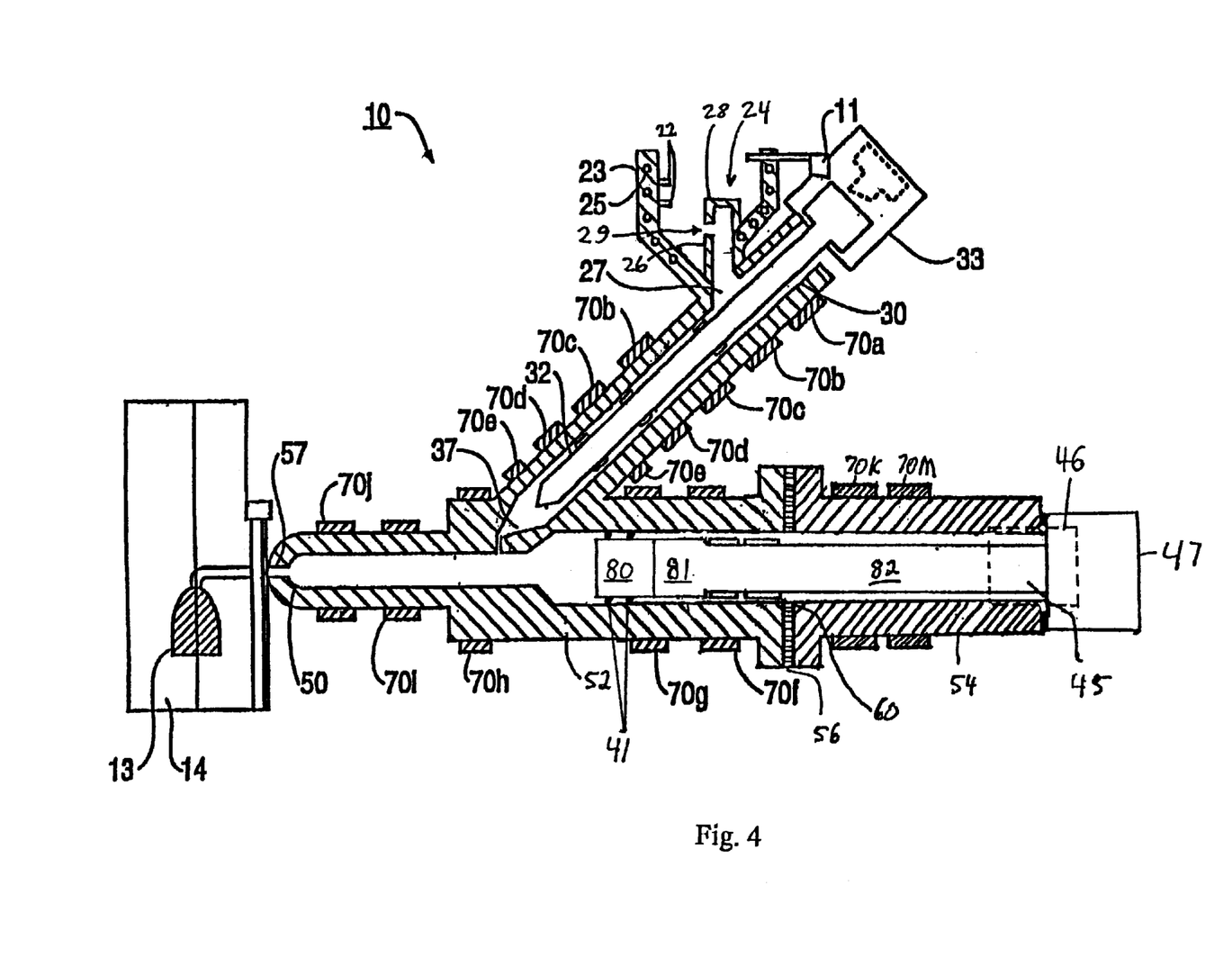
FIG. 4 is a schematic side cross sectional view of an injection molding system according to a preferred aspect of the present invention.

FIG. 4 illustrates a multichamber injection molding system 10 according to a preferred aspect of the present invention, which incorporates the injection chamber 50 of the first through the fourth preferred embodiments. The system 10 includes a feeder 23 into which metal alloy pieces or ingots, such as Mg alloy pieces are provided. The feeder 23 is provided with at least one heating element 25 disposed around its outer periphery. The heating element 25 may be of any conventional type and operates to maintain the feeder 23 at a temperature high enough to keep the metal alloy supplied through the feeder 23 in a liquid state. For a Mg alloy ingot, this temperature would be about 600° C. or greater, such as above about 610° C. for AZ91 Mg alloy. Two level detectors 22 are provided which detect minimum and maximum levels of melted metal in the feeder 23.

In a preferred aspect of the invention, the feeder 23 further contains an outlet screening element 24. For example, as illustrated in FIG. 4, the screening element 24 may comprise at least one non-horizontal wall 26, a top cover or portion 28 and an outlet port 29. Preferably, the outlet port 29 is located in one of the walls 26 instead of in the top 28 of the screening element 24. The screening element 24 may contain one wall 26 if the element 24 has a cylindrical shape, or plural walls 26 if the element 24 has a polygonal shape. Furthermore, the non-horizontal wall 26 is preferably exactly vertical or substantially vertical (i.e., deviating by about 1–20 degrees from vertical). The screening element 24 prevents solid metal pieces or ingots as well as other residue present in the melted metal from clogging the outlet port 29 because the outlet port 29 is raised from the bottom of the feeder 23. However, the screening element 24 may be omitted, if desired. A mixer (not shown) in feeder 23 may be included for the purposes of evenly distributing the heat from the heating element 25 to the metal supplied to the feeder 23.

The feeder 23 may contain an atmosphere of an inert gas to minimize oxidizing of the pre-heated and melted metal. A mixture of carbon dioxide ($CO_2$) and sulfur fluoride ($SF_6$) gas is preferred. However, other gasses, such as $CO_2$, $SF_6$, nitrogen or argon may be used alone or in any combination with each other. The inert gas may be introduced (e.g. from a pressurized tank) into the feeder 23 through port 11 to create an inert gas atmosphere above the bath.

The melted metal is subsequently supplied into a temperature-controlled barrel 30 by way of gravity through a feeder port 27 which may optionally be supplied with a valve serving as a stopper (not shown). Preferably, no valve is present. The temperature is controlled with heating elements 70a–70e. A ram 32 is arranged coaxially with the barrel 30 and extends along the center axis of the barrel 30. The outer diameter of the ram 32 is smaller than the inner diameter of the barrel 30 such that melted metal flows in the space between the ram 32 and the barrel 30. The ram 32 is controlled by motor 33 for axial movement in both retracting and advancing directions along the barrel 30 and for rotation around its own axis if stirring of the melted metal is desired inside barrel 30. If desired, the ram 32 may optionally contain fins which stabilize the ram 32 and which assist in stirring the metal present in the barrel 30.

The ram 32 shown in FIG. 4 has a pointed tip. However, any shape may be used, including a blunt end or a rounded end. Preferably, the end of ram 32 has a shape capable of blocking outlet port 37 to prevent the flow of melted metal between barrel 30 and injection chamber 50 if ram 32 is fully advanced inside barrel 30. While injection takes place, ram 32 is preferably fully advanced inside barrel 30 so that outlet port 37 is closed. After injection, the ram 32 is retracted (but may continue rotating if rotation is being used to stir the melted metal inside barrel 30), and a piston 45 (also known as a plunger) which is housed in the injection chamber 50 begins retracting (moved to the right as shown in FIG. 4) to expand the volume of the injection chamber 50 to a desired volume according to the dimensions of the molded part being produced. The piston 45 is stopped when the volume of the injection chamber 50 becomes equal to the desired injection volume. The piston 45 may be retracted at the same time that ram 32 is being retracted or after ram 32 has been retracted to a desired position. Preferably, the retraction of the piston 45 creates a suction in the injection chamber 50 which assists in drawing in the metal from the barrel 30 into the accumulation portion 52 of the injection chamber 50.

After piston 45 is stopped, the ram 32 is advanced downward, and, as a result, a portion of the metal collected in the lower portion of barrel 30 is pushed into the injection chamber 50 through the outlet port 37. The pressure of the metal entering into injection chamber 50 assists in driving out gas present in the injection chamber 50 that accumulates between the melted metal and piston 45. The ram 32 preferably advances through barrel 30 until its end closes off outlet port 37, and the ram 32 preferably remains in this position to keep outlet port 37 sealed off until injection is complete and the next shot is started.

Simultaneously, the piston 45 is pushed to the left, relative to the injection chamber 50, to force the melted metal in the injection chamber 50 through the die 14 into a mold cavity 13. This further increases the pressure in injection chamber 50. Although most of the metal is pushed into the die, the pressure causes some of the metal to flow backwards, past seals 41. By utilizing the features of any one or more preferred embodiments of the present invention, the amount of metal which gets into the drive mechanism 47 is reduced. Thus, the injection chamber 50 contains any one or-more of the following: piston rings, polygonal cross section in the shaft housing, openings in the shaft housing and below liquidus temperature in the second (i.e., rear) temperature zone.

Heating elements referenced and prefixed by the numeral 70 are preferably resistance heating elements, but may be inductive heating elements. For the AZ91 Mg alloy, heating elements 25 are preferably controlled so that the temperature in the feeder 23 is between about 630° C. and about 670° C. In the barrel 30, the temperature near the heating elements 70a–e is preferably maintained between about 610 and about 660° C. for the AZ91 Mg alloy.

In the injection chamber 50, the temperature near heating elements 70g, 70h, 70i, and 70j is preferably maintained between about 620° C. and about 705° C., preferably between about 635° C. and about 685° C. for the AZ91 Mg alloy. These temperatures are sufficiently high to maintain the melted metal entirely in the liquid state from the time it exits the feeder 23 into the barrel 30 to the time the melted metal is injected into the mold 14 from the injection chamber 50. The temperature near heating elements 70f, 70k and 70m is preferably maintained below the liquidus temperature of the metal, such as at about 550° C. to about 600° C., preferably at about 560° C. to about 580° C. for the AZ91 Mg alloy. The lower temperature behind the seal 41 helps prevent the metal from flowing past the seal 41.

The foregoing description of the invention has been presented for purposes of illustration and description. It is not intended to be exhaustive or to limit the invention to the precise form disclosed, and modifications and variations are possible in light of the above teachings or may be acquired from practice of the invention. The drawings and description were chosen in order to explain the principles of the invention and its practical application. It is intended that the scope of the invention be defined by the claims appended hereto, and their equivalents.

What is claimed is:

1. A method of making an injection molded metal part, comprising:
    providing a metal into an accumulation portion of an injection chamber;
    maintaining the accumulation portion of the injection chamber at a first temperature above the liquidus temperature of the metal;
    maintaining a shaft portion of the injection chamber at a second temperature below the liquidus temperature of the metal; and
    advancing an injection member having a head and a shaft in the injection chamber to inject the metal from the accumulation portion into a mold cavity.

2. The method of claim 1, wherein the first temperature is about 25 to about 75° C. above the liquidus temperature of the metal and the second temperature is about 10 to about 50° C. below the liquidus temperature of the metal.

3. The method of claim 1, further comprises retracting the injection member, such that the head of the injection member is located in the accumulation portion of the injection chamber and at least a portion of the shaft of the injection member is located in the shaft housing portion of the injection chamber.

4. The method of claim 3, further comprising:
    providing the metal into a barrel located above the injection chamber; and
    advancing a ram in the barrel to push the metal from the barrel into the accumulation portion of the injection chamber.

5. The method of claim 4, wherein the step of retracting the injection member comprises retracting a piston to create a suction in the accumulation portion of the injection chamber to draw in the metal from the band into the accumulation portion of the injection chamber.

6. The method of claim 1, wherein the step of advancing the injection member comprises advancing the shaft containing at least one ring through the shaft housing portion of the injection chamber, the shaft housing portion having a polygonal internal cross section and at least one opening in at least one side wall.

7. The method of claim 1, wherein the metal comprises a Mg alloy.

8. The method of claim 1, wherein maintaining a shaft portion of the injection chamber at a second temperature below the liquidus temperature of the metal comprises setting a heater at a temperature insufficient to raise the temperature of the shaft portion above the liquidus temperature of the metal.

9. An injection molding apparatus, comprising:
    an injection chamber comprising an accumulation portion and a shaft housing portion;
    an injection member comprising a head and a shaft located in the injection chamber;
    a first means for heating the accumulation portion of the injection chamber to a first temperature above a liquidus temperature of a metal injected by the injection member;
    a second means for heating the shaft housing portion of the injection chamber to a second temperature below a liquidus temperature of the metal injected by the injection member;
    at least one ring attached to the shaft of the piston; and
    at least one opening in a side wall of the shaft housing portion,
    wherein the injection member comprises a piston, such that the head of the piston in a fully retracted position is located in the accumulation portion, and at least a portion of the shaft of the piston in a fully retracted position is located in the shaft housing portion; and
    wherein the accumulation portion of the injection chamber has a circular internal cross section and the shaft housing portion of the injection chamber has a polygonal internal cross section.

10. An injection molding apparatus, comprising:
    an injection chamber comprising an accumulation portion and a shaft housing portion;
    an injection member comprising a head and a shaft located in the injection chamber;
    a first means for heating the accumulation portion of the injection chamber to a first temperature above a liquidus temperature of a metal injected by the injection member; and
    a second means for heating the shaft housing portion of the injection chamber to a second temperature below a liquidus temperature of the metal injected by the injection member,
    wherein the accumulation portion of the injection chamber has a circular internal cross section and the shaft housing portion of the injection chamber has a polygonal internal cross section.

* * * * *